US012602690B2

(12) United States Patent
Sidwell et al.

(10) Patent No.: US 12,602,690 B2
(45) Date of Patent: Apr. 14, 2026

(54) SYSTEMS AND METHODS FOR TRANSACTION AUTHORIZATION

(71) Applicant: TYTONICAL LIMITED, Surbiton (GB)

(72) Inventors: Grant Sidwell, Surbiton (GB);
Matthew Cook, Surbiton (GB);
Andrew Ryrie, Surbiton (GB)

(73) Assignee: TYTONICAL LIMITED, Surbiton (GB)

( * ) Notice: Subject to any disclaimer, the term of this patent is extended or adjusted under 35 U.S.C. 154(b) by 0 days.

(21) Appl. No.: 17/925,788

(22) PCT Filed: May 18, 2021

(86) PCT No.: PCT/GB2021/051192
§ 371 (c)(1),
(2) Date: Nov. 16, 2022

(87) PCT Pub. No.: WO2021/234367
PCT Pub. Date: Nov. 25, 2021

(65) Prior Publication Data
US 2023/0281627 A1 Sep. 7, 2023

(30) Foreign Application Priority Data
May 18, 2020 (GB) ..................................... 2007362

(51) Int. Cl.
*G06Q 20/40* (2012.01)
*G06Q 20/32* (2012.01)
(Continued)

(52) U.S. Cl.
CPC ... *G06Q 20/40145* (2013.01); *G06Q 20/3224* (2013.01); *G06Q 20/3265* (2020.05);
(Continued)

(58) Field of Classification Search
CPC ......... G06Q 20/40145; G06Q 20/3224; G06Q 20/3265; G06Q 20/3274; G06Q 20/3276;
(Continued)

(56) References Cited

U.S. PATENT DOCUMENTS 10,380,566 B2 * 8/2019 Klein .................... G06Q 20/405
11,436,588 B1 * 9/2022 Roth .................. G06Q 30/0185
(Continued)

FOREIGN PATENT DOCUMENTS

AU 2013260701 9/2014
GB 2559384 A1 8/2018
(Continued)

OTHER PUBLICATIONS

Predicting travel time reliability using mobile phone GPS data (Year: 2015).*
(Continued)

*Primary Examiner* — James H Miller
(74) *Attorney, Agent, or Firm* — Day Pitney LLP; George Chaclas; Anthony A. Kassas

(57) ABSTRACT

A set of user accounts are maintained, each associated with a corresponding mobile device. Each user account comprises a set of user-identifying features, including at least one of: an image of a user-identifying asset, and information that is derivable from an image of a user-identifying asset. Each user account also comprises the location of the associated mobile device and transactional data, such as payment card data, for performing a transaction. An image of a user-identifying asset is captured at a known service location, and a match is determined with one of the user accounts dependent on image and location similarity. The use of transactional data from the matched user account is therefore authorized, and so service provision at the service location is permitted.

17 Claims, 4 Drawing Sheets

(51) Int. Cl.
  *G06V 10/44* (2022.01)
  *G06V 10/74* (2022.01)

(52) U.S. Cl.
  CPC ..... *G06Q 20/3274* (2013.01); *G06Q 20/3276* (2013.01); *G06Q 20/4015* (2020.05); *G06Q 20/405* (2013.01); *G06V 10/44* (2022.01); *G06V 10/761* (2022.01)

(58) Field of Classification Search
  CPC .. G06Q 20/4015; G06Q 20/405; G06Q 20/18; G06Q 20/202; G06Q 20/206; G06Q 20/3263; G06Q 20/40155; G06Q 20/4014; G06V 10/44; G06V 10/761; G07F 13/025
  See application file for complete search history.

(56) References Cited

U.S. PATENT DOCUMENTS

| | | | | |
|---|---|---|---|---|
| 2006/0182311 | A1* | 8/2006 | Lev | G06F 18/28 |
| | | | | 382/254 |
| 2014/0066101 | A1* | 3/2014 | Lyman | H04L 67/52 |
| | | | | 455/456.3 |
| 2014/0279096 | A1* | 9/2014 | Akin | G06Q 20/405 |
| | | | | 705/16 |
| 2014/0364150 | A1* | 12/2014 | Marti | H04W 4/029 |
| | | | | 455/456.3 |
| 2015/0032621 | A1* | 1/2015 | Kar | G06Q 20/4016 |
| | | | | 705/44 |
| 2015/0106196 | A1* | 4/2015 | Williams | G06Q 30/0253 |
| | | | | 705/14.51 |
| 2015/0120873 | A1* | 4/2015 | Williamson | H04L 63/107 |
| | | | | 709/217 |
| 2015/0141045 | A1* | 5/2015 | Qiu | H04W 4/021 |
| | | | | 455/456.1 |
| 2015/0242969 | A1* | 8/2015 | Pallas | B67D 7/145 |
| | | | | 705/39 |
| 2016/0012416 | A1* | 1/2016 | Sharma | G06Q 20/346 |
| | | | | 235/380 |
| 2016/0217186 | A1* | 7/2016 | Agarwal | G06F 16/22 |
| 2016/0321633 | A1* | 11/2016 | Chandrasekaran | G06Q 20/20 |

| | | | | |
|---|---|---|---|---|
| 2017/0176568 | A1* | 6/2017 | Dureau | H04L 67/535 |
| 2017/0279957 | A1* | 9/2017 | Abramson et al. | G06F 21/36 |
| 2017/0323299 | A1* | 11/2017 | Davis | G06Q 20/204 |
| 2017/0339169 | A1* | 11/2017 | Wallace, III | H04L 63/1416 |
| 2018/0007070 | A1* | 1/2018 | Kulkarni | H04L 63/1425 |
| 2018/0186309 | A1* | 7/2018 | Batten | G09G 3/36 |
| 2018/0204206 | A1* | 7/2018 | Flurscheim | G06K 19/06037 |
| 2018/0240169 | A1* | 8/2018 | Driscoll | G06Q 30/0609 |
| 2018/0253805 | A1* | 9/2018 | Kelly | G06Q 50/12 |
| 2020/0053119 | A1* | 2/2020 | Schnieders | G06V 10/761 |
| 2020/0074442 | A1* | 3/2020 | Kulkarni | G06Q 20/3276 |
| 2020/0111103 | A1* | 4/2020 | Kalaboukis | G06Q 20/326 |
| 2020/0151703 | A1* | 5/2020 | Nepomniachtchi | G06Q 20/3276 |
| 2020/0218743 | A1* | 7/2020 | Sung | H04L 67/12 |
| 2020/0228525 | A1* | 7/2020 | Boncimino | G06Q 20/40145 |
| 2021/0241563 | A1* | 8/2021 | Chittenden, Jr. | G07F 13/025 |
| 2022/0292517 | A1* | 9/2022 | Mimassi | G06F 21/32 |
| 2024/0144271 | A1* | 5/2024 | Henderson | G06Q 20/325 |

FOREIGN PATENT DOCUMENTS

| | | | | |
|---|---|---|---|---|
| WO | WO-2010022185 A1 * | 2/2010 | | G06V 20/10 |
| WO | 2015062229 A1 | 5/2015 | | |
| WO | WO-2017151815 A1 * | 9/2017 | | G06Q 30/016 |
| WO | 2018113222 A1 | 6/2018 | | |
| WO | WO-2018106987 A1 * | 6/2018 | | G06V 40/1394 |
| WO | WO-2018145195 A1 * | 8/2018 | | G06Q 20/40 |
| WO | WO-2019067030 A1 * | 4/2019 | | G06Q 30/02 |
| WO | 2020028870 A1 | 2/2020 | | |

OTHER PUBLICATIONS

Inferring and Predicting Context of Mobile Users (Year: 2007).*
User-driven Idle Energy Save for 802.11x Mobile Devices (Year: 2014).*
GPS Tethering for Energy Conservation (Year: 2015).*
Tracking Context of Smart Handheld Devices (Year: 2015).*
A Location-Aware Framework for Intelligent Real-Time Mobile Applications (Year: 2002).*
International Search Report and Written Opinion in corresponding Application No. PCT/GB/2021/051192, dated Jul. 25, 2021, (15 pages).

* cited by examiner

300

START maintain set of user accounts — 301 capture an image of a user-identifying asset — 302 determine a match with one of the user accounts — 303 authorise performance of a transaction — 304

FINISH

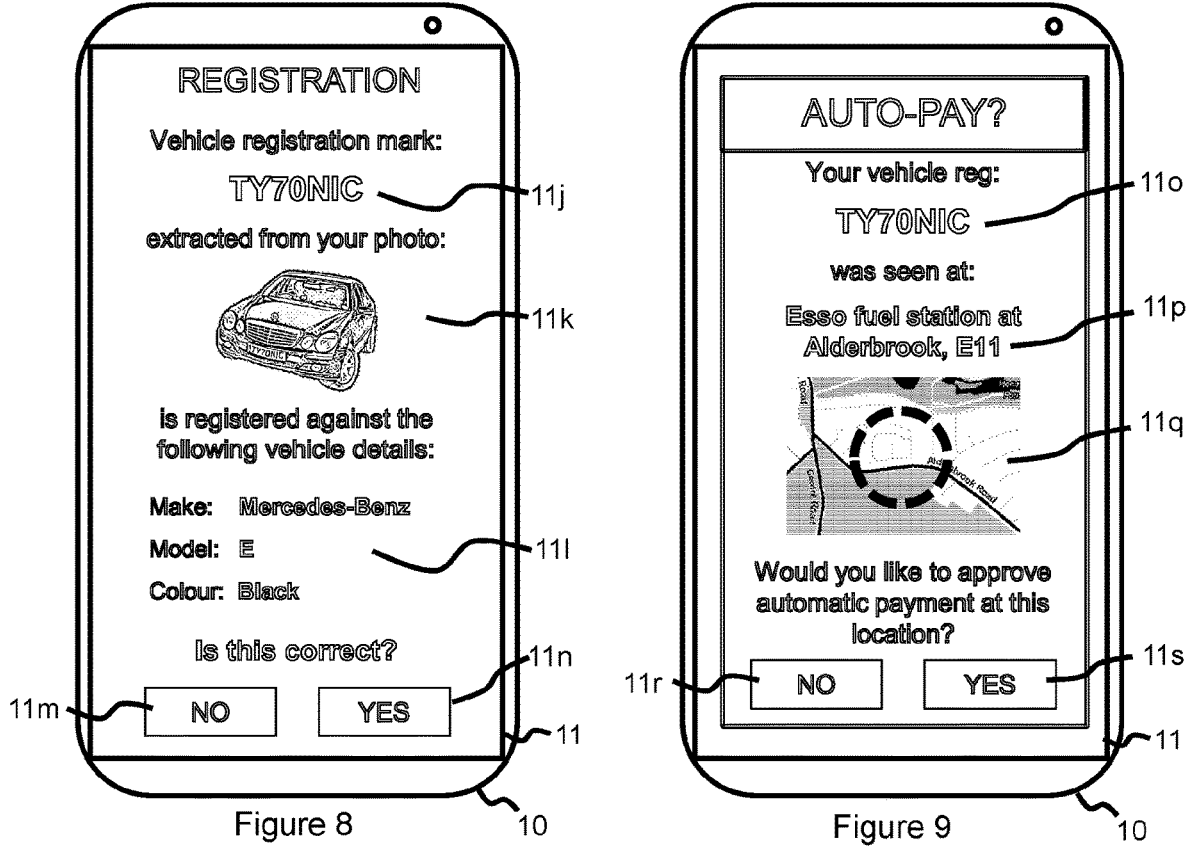
Figure 8                    Figure 9

SYSTEMS AND METHODS FOR TRANSACTION AUTHORIZATION

CROSS-REFERENCE TO RELATED APPLICATIONS

The present application is a U.S. National Stage Application of International Application No. PCT/GB2021/051192, filed May 18, 2021 and published on Nov. 25, 2021 as WO2021/234367 A1, which claims benefit and priority of Great Britain Patent Application No. GB2007362.3, filed on May 18, 2020, each of which is incorporated herein by reference in its entirety for any purpose whatsoever.

FIELD OF THE DISCLOSURE

The present disclosure relates to a transaction authorization system and method. In particular, the present disclosure relates to authorizing transactions, such as payments for fuel, parking, and other goods and services.

BACKGROUND OF THE DISCLOSURE

Transactions that involve electronic payment for goods and services can currently be carried out using a payment card, such as a credit or debit card. A user presents their payment card at a payment terminal, keys-in a PIN to authorize the payment.

While contactless payment removes the requirement for PIN entry, the payment card still needs to be in close proximity to a contactless payment card reader. Also, for security purposes, such contactless transactions typically have a maximum transaction value.

This is particularly an issue for the refuelling of vehicles. Refuelling often incurs charges higher than a typical maximum transaction value for contactless payment. Additionally, refuelling typically requires a user to operate a fuel dispenser at one location within a service station, and then visit another location, such as a payment kiosk, to provide payment. This is inconvenient, takes up valuable time, and also delays other customers of the service station using its facilities. Similar drawback exist for other transactions—such as those for the payment of parking facilities.

It is against this background that the present invention has been devised.

SUMMARY

According to a first aspect of the present invention there may be provided a transaction authorization system. The system may comprise at least one of: a plurality of mobile devices, a central server, and an image capture device. Preferably, mobile devices are configured to operate by a transaction authorization application. The transaction authorization application may be downloaded to mobile devices via a wireless telecommunication module of said mobile device.

The central server may be configured to maintain a set of user accounts, each associated with a corresponding one of the mobile devices. User accounts comprise at least one of:
  a set of user-identifying features, including at least one of:
    an image of a user-identifying asset (such as a face or front of a vehicle), and information that is derivable from an image of a user-identifying asset (such as a vehicle registration mark—VRM);

a unique identifier of the associated mobile device—ideally for uniquely identifying, addressing and/or contacting that mobile device;
  location data, ideally including the location of the associated mobile device, and a location update time for indicating when that location of the associated mobile device was updated; and
  transactional data, such as user payment card data, for performing a transaction.

Mobile devices may be configured by the transaction authorization application to determine and transmit their location to the central server so as to update the location data of the user account with which that corresponding mobile device is associated.

An image capture device may be located at a service location. The image capture device may be configured to automatically capture and transmit an image of a user-identifying asset. The image may be further associated with a capture time and a location identifier unique to the service location. The captured image may be sent directly to the central server. Features may be extracted from the captured image, and those may be sent to the central server instead of/in addition to the image.

The central server may be configured to receive the image from the image capture device, and/or features derived from that image. In response, the central server may be configured to determine a match with one of the user accounts. The determination of a match may be dependent on at least one of:
  image similarity, including the similarity of features of the captured image, and those of the set of user-identifying features;
  location similarity, including the similarity of the known location of the service location, and the location of the mobile device; and
  the time of capture of the image of the user-identifying asset, and the time of the mobile device location update.

The central server may be further configured to authorize use of the transactional data of the user account with which a match has been determined to perform a transaction. Accordingly, service provision at the service location can be permitted. Moreover, the system can carry out the transaction, involving a service being provided at the service location.

The central server may be configured to receive the image from the image capture device, or features derived from that image, and in response determine a match with one of the user accounts by filtering. Filtering may comprise firstly filtering the set of user accounts based on either image similarity or location similarity, and then further narrowing the filtered set of user accounts based on the other of image similarity or location similarity. Moreover, the central server may be configured to choose one user account from the filtered set based on the other of image similarity or location similarity.

The central server may be configured to maintain a set of user accounts by determining user accounts that have a location update time that is older than a threshold amount. In response the central server may be configured to send a location request to mobile devices associated with those user account. The threshold amount may be a value measured relative to a current time. The threshold amount may be less than 48 hours than a current time. The threshold amount is ideally less than 24 hours than a current time. More preferably, the threshold amount is ideally less than 6 hours than a current time. Most preferably, the threshold amount is ideally less than 1 hour than a current time.

Mobile devices may be configured by the transaction authorization application to determine and transmit their location to the central server in response to receiving a location request from the central server and/or according to a location update rule or schedule. The update rule or schedule may be dependent on at least one of: the time of day, and an internal state of the mobile device (such as the battery level of the mobile device).

Mobile devices may comprise a positioning module. Accordingly, mobile devices may be configured by the transaction authorization application to activate their positioning module to determine the location of the mobile device for transmission to the central server. Following transmission, the transaction authorization application may configure the mobile device to place the positioning module into a low-power sleep mode—advantageously conserving energy.

The central server may be configured to authorize use of the transactional data of the user account with which a match has been determined within a predetermined timeframe. The predetermined timeframe may be measured relative to a capture time of the captured image used by the server to determine a match with that user account. The predetermined timeframe may be less than 60 minutes. Preferably, the predetermined timeframe is less than 30 minutes. Ideally, the predetermined timeframe is less than 10 minutes. If a transaction using the transactional data of the user account has not been performed within the predetermined timeframe, the central server may be configured to deauthorize the use of the transactional data.

Following on from this, the central server may be configured to deauthorize the previously authorized use of the transactional data. This may be in response to the central server receiving a state-change message. For example, the state-change message may be sent by detecting that a user-identifying asset previously at the service location is leaving, or no longer at the service location. The state-change message may be trigger by receiving an updated location of the mobile device that indicates that the mobile device is above a threshold distance from the service location to allow a transaction to be authorized.

The central server may be configured to receive the image from the image capture device, or features derived from that image, and in response, determine matches with a candidate first set of user accounts based on the similarity of features of the captured image, and those of the user-identifying features of the candidate first set of user accounts. Thereafter, the central server may be configured to determine a match with a subset (ideally one) of the candidate first set of user accounts dependent on the similarity of the location of each mobile device associated with the candidate first set of user accounts, and that of the service location.

Alternatively, the central server may be configured to receive the image from the image capture device, or features derived from that image, and, in response, determine matches with a candidate second set of user accounts based on the similarity of the known location of the service location from which that image originates, and the location of the mobile device of the candidate second set of user accounts. Thereafter, the central server may be configured to determine a match with a subset (ideally one) of the candidate second set of user accounts dependent on the similarity of features of the captured image, and those of the user-identifying features of the candidate second set of user accounts.

The central server may be configured to transmit location requests to each mobile device associated with the candidate first and/or second set of user accounts to obtain up-to-date location data for those user accounts prior to determining a match with a subset of them.

The central server may be configured to determine a match with one of the user accounts dependent on the similarity of the known location of the service location, and a mobile device location by:

calculating a time difference between a time of capture of the image of the user-identifying asset, and the time of the mobile device location update;

calculating a distance between the known location of the service location, and that of the mobile device location;

determining the probability of the mobile device travelling the calculated distance within a period corresponding to the calculated time difference; and/or filtering out user accounts where the determined probability is below a predetermined value.

The predetermined probability value may be defined in response to at least one of: time of day, day of the week and traffic conditions between or around the known location of the service location, and that of the mobile device location.

The central server may be configured to determine a match with one of the user accounts dependent on the similarity of the known location of the service location, and a mobile device location by filtering out user accounts that have a mobile device location update older than a threshold amount.

The set of user-identifying features in user accounts may comprise an alphanumeric string. The alphanumeric string may be a VRM of a vehicle serving as a user-identifying asset. The system may further comprise a feature extraction module configured to receive images from the image capture device and process them to extract a set of features. Naturally, the extracted features are those derived from a respective image, and these derived features may be sent to the central server. The extracted set of features may comprise a corresponding extracted alphanumeric string. Accordingly, the central server may be configured to determine a match with at least one of the user accounts by comparing the extracted set of features with those stored as user-identifying features in user accounts. Specifically, the central server may be configured to determine a match with at least one of the user accounts by comparing the extracted alphanumeric string with user account alphanumeric strings.

Matching of the extracted alphanumeric string with user account alphanumeric strings may comprise the central server executing a fuzzy string searching algorithm. Accordingly, a match with at least one of the user accounts may be determined if the string distance (e.g. the Levenshtein or Hamming distance), as determined by the fuzzy string searching algorithm, is less than a threshold value.

The central server executing the fuzzy string searching algorithm may comprise applying a character visual-similarity table, wherein string differences caused by more visually-similar characters result in a smaller string distance.

The set of user-identifying features in user accounts may comprise an alphanumeric string of a VRM of a vehicle serving as a user-identifying asset. Advantageously, the central server executing the fuzzy string searching algorithm may comprise applying VRM convention rules, wherein string differences caused by unconventional VRM character arrangements result in a larger string distance.

The central server may be configured to determine a match with one of the user accounts, and transmit a match message to the mobile device associated with that user account. The mobile device may be configured by the application to receive the match message, and in response issue a notification to a user of the mobile device to indicate readiness to authorize use of the transactional data to perform a transaction. A user can therefore be notified of permission to be provided a service at the service location.

The mobile device may be configured by the application to receive the match message and in response display, on an electronic screen of the mobile device, a user-interactable approval element. The user-interactable approval element may be configured to receive a user interaction to specify approval of the transaction.

The mobile device may be further configured to send an approval response to the central server. This may be dependent on user interaction with the user-interactable approval element. Alternatively, this may be dependent on the lack of user interaction with the user-interactable approval element. Accordingly, the central server may be configured to authorize use of the transactional data of the user account to perform a transaction depending on the approval response received from that mobile device.

The match message may comprises an identification of the service location. The mobile device may be configured by the application to receive the match message, and in response issue a notification to a user of the mobile device to identify the service location. Advantageously, this provides contextual information to help a user decide whether to approve of the transaction.

Each mobile device may be configured by the transaction authorization application to conduct a registration process. The registration process may comprise at least one of:

issuing instructions, via a screen of the mobile device, to a user to perform actions involving the user-identifying assets;

recording those actions to generate a corresponding set of user-identifying features; and sending the set of user-identifying features to the central server to establish or update a corresponding user account associated with that mobile device.

For example, recording actions performed by the user may comprise enabling a camera sensor of the mobile device to record a picture of at least one user-identifying asset. The user-identifying asset may be a VRM, a vehicle, and/or a face of a user.

The registration process may comprise at least one of:

issuing instructions, via a screen of the mobile device, to a user to perform actions involving a payment instrument, such as a payment card;

recording those actions to generate a corresponding set of transactional data; and sending the transactional data to the central server to establish or update a corresponding user account associated with that mobile device.

For example, recording actions performed by the user may comprise enabling a camera sensor of the mobile device to record a picture of a payment instrument, such as a payment card. The registration process may comprise processing the picture of the payment instrument to extract transactional data from it.

The system may comprise a data fidelity checker. The data fidelity checker may be configured to receive a set of user-identifying features. Naturally, the set of user-identifying features received by the data fidelity checker are those intended to establish or update a corresponding user account. The data fidelity checker may be configured to check the fidelity of that set of user-identifying features, and/or authorize establishment or update of a corresponding user account depending on the outcome of the fidelity check. The data fidelity checker may issue a warning if the fidelity of that set of user-identifying features is insufficient. Each user-identifying feature received by the data fidelity checker may be associated with a predefined category of asset.

The data fidelity checker may be configured to check the fidelity of that set of user-identifying features by performing a fidelity check. The fidelity check may comprise at least one of:

determining that a user-identifying feature is a valid example of the category with which it is associated;

determining that sufficiently distinguishing features can be extracted from an image of user-identifying asset;

cross-checking one user-identifying feature with another; and cross-checking information derivable from an image of a user-identifying asset against a pre-validated data set.

The system may further comprise a service location controller. The service location controller may be configured to receive a user account match verification from the central server and in response provide access to a service at the service location.

The service location controller may be in communication with a service dispenser, such as a fuel dispenser or a barrier arm for example.

The match verification from the central server may comprise a fuel dispensing value. The service location controller may be in communication with a fuel dispenser at the service location, and configured to control the fuel dispensed by the fuel dispenser in dependence on the fuel dispensing value.

The system may comprise an authorization indicator at the service location. The service location controller may be configured to receive a match verification from the central server and in response communicate with the authorization indicator to indicate to a user at the service location the status of the authorization.

The system may comprise an image-based position detector. The image-based position detector may be configured to:

receive a definition of a set of service zones, the definition being associated with the image capture device at a service location, each service zone having associated with it a unique service dispenser, such as a fuel dispenser;

receive an image from the image capture device;

determine from the received image the occupation by a user-identifying asset, such as a vehicle, of one of the set of service zones; and/or authorize the service dispenser within the determined one of the set of service zones to dispense a service as part of the transaction authorized by the central server.

The system may comprise a barcode uniquely associated with the service location. Mobile devices may be configured by the application to receive from a user a scan command. In response to receiving a scan command, the mobile device may be configured to:

activate a camera of the mobile device to scan the barcode;

derive from the barcode a code uniquely associated with the service location; and/or send the code to the central server as evidence of the mobile device being at the service location.

The central server may be configured to receive the code from the mobile device and, in response, authorize use of the transactional data of the user account associated with that mobile device.

A user-identifying asset may be in the form of a barcode. Accordingly, user accounts may comprise a set of user-identifying features that includes barcode information that is derivable from an image of a user-identifying asset in the form of a barcode.

Mobile devices may be configured by the application to receive a barcode generation command and in response generate a barcode corresponding to the barcode information within the user account associated with the mobile device. Mobile devices may be configured by the application to display the barcode on an electronic screen of the mobile device.

Advantageously, the image capture device may be configured to capture and send an image of the barcode displayed on the electronic screen of the mobile device. The central server may be configured to receive the image of the barcode from the image capture device, or features derived from that image, and in response determine a match with one of the user accounts.

Mobile devices may be configured by the application to receive a barcode generation command and in response determine, from a positioning module of the mobile device, the location of the mobile device, and generate the barcode, at least part of which is dependent on the determined location of the mobile device.

Mobile devices may be configured by the application to receive a barcode generation command and in response generate the barcode, at least part of which is dependent on the time of generation.

According to a second aspect of the present invention there is provided a mobile device for use in authorizing a transaction. The mobile device may be configured by an application for this use, and preferably in conjunction with a system according to the first aspect of the present invention. The mobile device may be a mobile telecommunications device. The mobile device may be integrated with a vehicle. The mobile device may comprise at least one of: an electronic touch-sensitive screen, a sensor set, and a wireless telecommunications module. The sensor set may include at least one camera and a positioning module.

The wireless telecommunications module may be operable to download a transaction authorization application. The mobile device may be arranged to execute the application to control the mobile telecommunications device to perform at least one step of a transaction authorization method.

The mobile telecommunications device may be arranged to execute the application to control the mobile telecommunications device to prompt the user (e.g. via the screen) to take a set of actions. The set of actions may include capturing, using the camera, a set of user-identifying features associated with at least one user-identifying asset. Advantageously, this is for use in identifying the presence of a user at a service location. The set of actions may include inputting transactional data—ideally for use in a transaction at the service location.

The mobile telecommunications device may be arranged to execute the application to:

transmit, via the wireless telecommunications module, the captured set of user-identifying features and the transactional data to a central server;

determine a location of the mobile device, via the positioning module;

send the determined location of the mobile device to the central server for use in determining the proximity of the user to the service location; and/or receive, from the central server, a match message, and in response issue a notification to a user of the mobile device to indicate readiness to authorize use of the transactional data to perform a transaction relating to the provision of a service at the service location.

According to a third aspect of the present invention there is provided a transaction authorization method. The method may comprise maintaining a set of user accounts, each associated with a corresponding mobile device. User accounts may comprise at least one of:

a set of user-identifying features, including at least one of: an image of a user-identifying asset, and information such as a vehicle registration mark (VRM) that is derivable from an image of a user-identifying asset;

a unique identifier of the associated mobile device;

location data, including the location of the associated mobile device;

a location update time for indicating when that location of the associated mobile device was updated; and transactional data, such as payment card data, for performing a transaction.

The method may comprise capturing an image of a user-identifying asset. The image may be captured at a service location. The service location may be of a known location. The image may be assigned with at least one of a capture time, and a service location identifier.

The method may comprise determining a match with one of the user accounts dependent on the similarity of features of the captured image, and the set of user-identifying features of that user account. The method may comprise determining a match with one of the user accounts dependent on the similarity of the location at which the image was captured (e.g. that of the service location), and the location of the mobile device.

The method may further comprise authorizing use of the transactional data of the user account with which a match has been determined. The authorized used of the transactional data may be to perform a transaction that permits service provision at the service location.

It will be understood that features and advantages of different aspects of the present invention may be combined or substituted with one another where context allows.

For example, the features of the system described in relation to the first aspect of the present invention may be provided as part of the mobile device of the second aspect, and/or the method described in relation to the third aspect of the present invention.

Furthermore, such features may themselves constitute further aspects of the present invention, either alone or in combination with others. For example, the features of the transaction authorization application, the central server, the feature extraction module, the data fidelity checker, the service location controller, a personal data silo, the feature matching module, and the image capture device may themselves constitute further aspects of the present invention.

BRIEF DESCRIPTION OF THE DRAWINGS

In order for the invention to be more readily understood, embodiments of the invention will now be described, by way of example only, with reference to the accompanying drawings in which:

FIGS. 4 to 9 are schematic views of the mobile device of FIG. 2, the mobile device being configured by a transaction authorization application to display on its screen various user interface (UI) elements.

DETAILED DESCRIPTION

Figure 1:
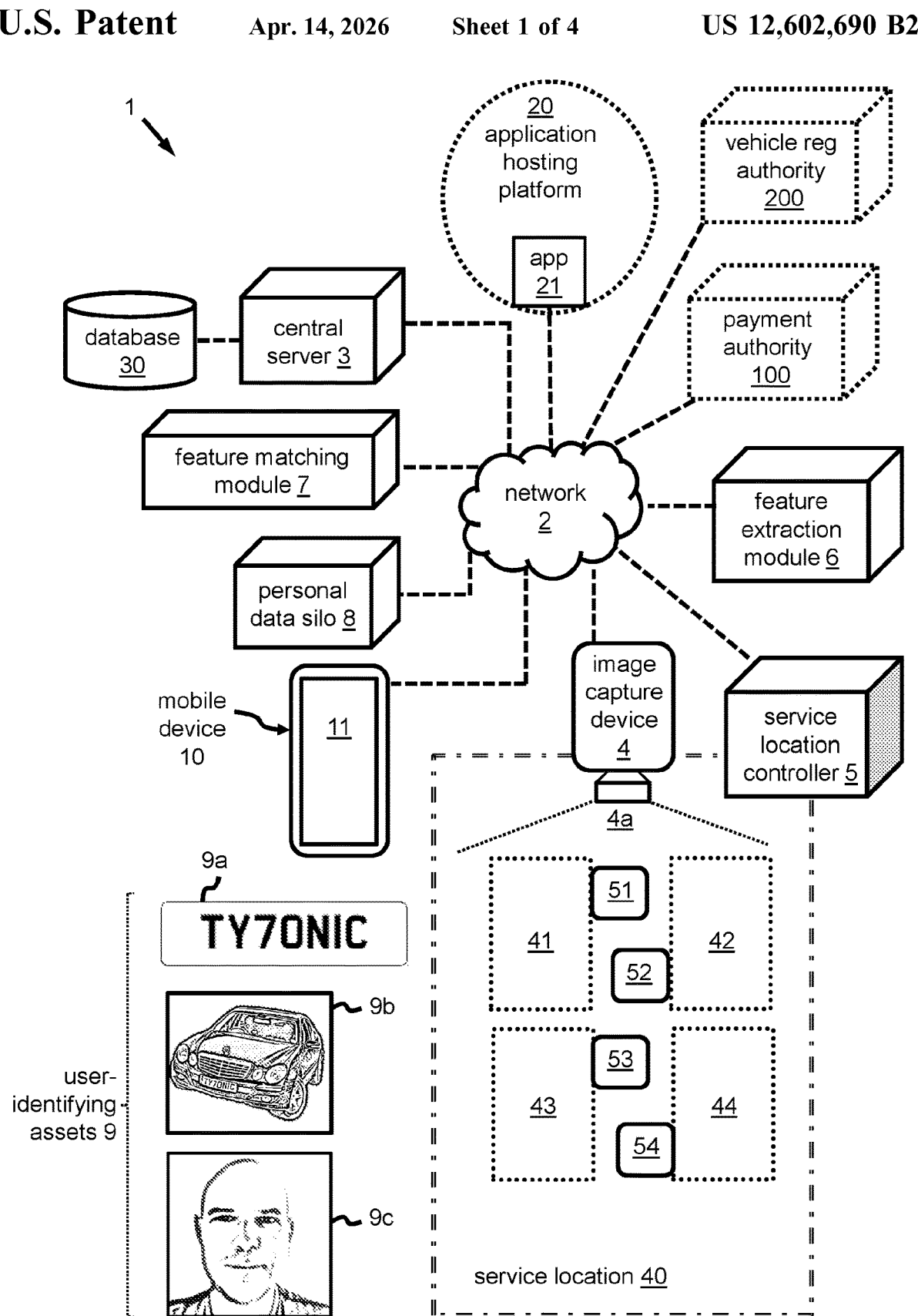
FIG. 1 shows a schematic view of a transaction authorization system according to various embodiments of the present invention.

FIG. 1 shows a schematic view of a transaction authorization system 1 according to a first exemplary embodiment of the present invention. The system 1 is configured to implement a method of authorizing a transaction, a generalised example of which is shown in FIG. 3.

Figures 2, 3:
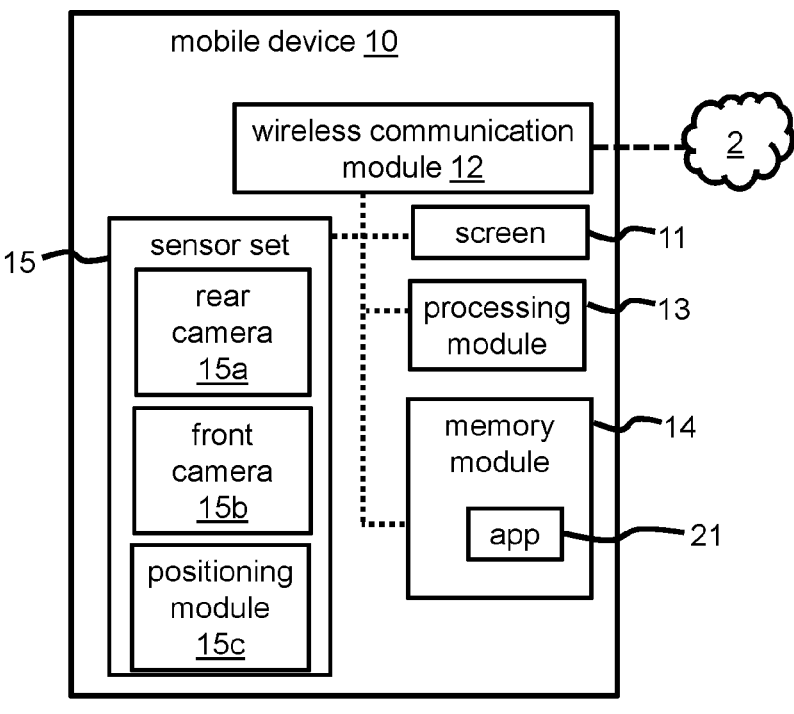
FIG. 2 is a schematic block diagram of a mobile device of the system of FIG. 1.
FIG. 3 is a flow diagram of a transaction authorization method according to various embodiments of the present invention.

By way of overview and referring to FIG. 3, in general terms, the transaction authorization method 300 comprises four main steps. A first step 301 of the method 300 includes maintaining a set of user accounts, each user account being associated with a corresponding mobile device. For example, each user account may include a unique identifier that allows a corresponding mobile device to be uniquely identified and addressed.

Each user account includes a set of user-identifying features. These can be in the form of images and/or text. For example, a user-identifying feature may be an image of a user-identifying asset—such as a vehicle of user, for example. Alternatively, user-identifying features may be data that can be derived from such an image of a user-identifying asset—for example, the alphanumeric string corresponding to the vehicle registration mark of the user vehicle.

Also maintained in the user account is the location of the mobile device. This is typically updated by the mobile device according to a schedule. Alternatively, the mobile device may provide an update to a corresponding user account about its location in response to a location request. The most recent location of the mobile device is recorded within the corresponding user account alongside an update time—i.e. the time at which that most recent update was sent from the mobile device, or otherwise received at the user account. Thus, from this, it is possible to determine if the location of the mobile device needs updating, and if so a location request can be issued to the mobile device to report a more recent location.

A second step 302 of the transaction authorization method 300 includes capturing, at a service location, an image of a user-identifying asset. This may be achieved with an image capture device such as an ANPR (Automatic Number Plate Recognition) device. Also associated with the captured image is a time of capture of that image of the user-identifying asset.

A third step 303 of the transaction authorization method 300 includes determining a match with one of the set of user accounts on the basis of similarity between the information captured in the second step 302 and the details maintained in the user accounts as part of the first step 301. More specifically, features within the captured image of the user-identifying asset are compared for similarity with the set of user-identifying features stored in the user account. Also, the location of the service location—at which that image was captured—is compared to the most up-to-date location of the mobile device.

Thus, in response to the capturing of the image at the service location, and dependent on location similarity and image similarity, a match can be determined with one of the user accounts. From this it can be inferred with a high degree of certainty that a user—who is assumed to be in possession of their mobile device—is at a service location. From this inference, a transaction that involves the provision of a service to the user at the service location can be authorized.

Step 304 of the method 300 comprises authorizing the transaction. User accounts also include transactional data, such as payment data, to allow a payment transaction to be conducted. Therefore, authorizing the transaction may include the authorized use of such transactional data to pay for goods and services at the service location. This may be payment for access to or use of a parking facility, fuel dispensing, and others similar services.

While described embodiments of the present invention are particularly applicable to transactions that involve the provision of services specific to vehicles, it should be noted that other embodiments may not necessarily be restricted to the same. Furthermore, in alternative embodiments, different types of transactions may be authorized in addition to or instead of payment data.

For example, embodiments of the invention extend to transactions involving transferring consumer personal data (such as consumer preference data) to a service location for the effective and personalised delivery of a service.

Advantageously, this exchange of consumer data can be performed contemporaneously with service provision and so the necessity for a service location to store consumer personal data permanently can be obviated. This has data storage and security benefits, as well as legal benefits associated with consent for use and storage of potentially sensitive personal data.

A more specific implementation of the transaction authorization method 300 is carried out by the system shown in FIG. 1 as will now be described. It should be noted that every component shown in and described with reference to FIG. 1 is not necessarily an essential part of other embodiments of the invention—they are merely included for completeness. Notably, some of the components may be simply used by or interact with the transaction authorization system 1 rather than necessarily being integral parts of the system itself.

For example, user-identifying assets 9, such a plate bearing a vehicle registration mark (VRM) 9a, a vehicle 9b bearing such a VRM, and a face 9c of a user of the system 1 are components that interact with the system 1. Thirty-party authorities, such as a payment authority 100 and a vehicle registration authority 200, are also components that interact with the system 1. A typical interaction between, for example, the payment authority 100, and the system is receipt by the payment authority 100 of an instruction from the system 1 to carry out a payment transaction for a service, the execution of that payment transaction, and issuing a receipt from the payment authority 100 to the system 1 corresponding to a successfully-executed payment transaction.

In the embodiment shown in FIG. 1, the transaction authorization system 1 comprises at least part of a communications network 2, a transaction authorization app 21, a central server 3, an image capture device 4, a service location 40, a service location controller 5, a feature extraction module 6, a feature matching module 7, a personal data silo 8, and a mobile device 10 that is configured by the app 21. To this end, an application hosting platform 20—such as the Apple® Appstore™, or the Google® Play™ Store—initially hosts the app 21 which is subsequently downloaded to the mobile device 10 and executed. In alternatives, the mobile device 10 may be pre-loaded with the application.

The communications network 2 interconnects the components of the transaction authorization system 1 and in various embodiments may be embodied by a wired and/or wireless local area network (LAN), a wide area network (WAN) such as the Internet, or a combination of these.

Moreover, certain components of the system 1 shown in FIG. 1 may reside on a single device and so, in this case, the communications network 2 may include intra-device communication channels.

Leading on from this, certain components shown in FIG. 1 may be provided as part of or otherwise integrated with others. Notably, the feature matching module 7 is implemented as a virtual module on the central server 3. Additionally, the feature extraction module 6 of FIG. 1 is a software module integrated with the image capture device 4.

While the separation in FIG. 1 of these components is shown schematically to illustrate their functional role and relationship, they can each, in practice, be combined within another device or set of devices. For example, in other embodiments, the feature extraction module 6 may be implemented virtually on the central server 3 in addition to, or instead of being integrated with the image capture device 4.

Moreover, components may not necessarily be in the form of a single physical machine or device. For example, the term "server" may encompass, for example, a distributed or "cloud" computing service, engine, service or platform.

Also, for simplicity and clarity, only single exemplary instances of most components of the system 1 are shown in FIG. 1. Nonetheless, in practice, the transaction authorization system 1 typically will include at least thousands of mobile devices 10 and at least hundreds of service locations 40. Accordingly, the number of image capture devices 4 and other components at each service location will also be multiplied.

Additionally, different service locations 40 may have varying configurations: FIG. 1 specifically shows a service location 40 in the form of a vehicle refuelling station. However, other service locations may be of other types such as vehicle parking facilities, restaurant drive-throughs and similar. Notably, embodiments of the present invention are envisaged to have particular applicability for services delivered at service locations 40 that are suitable for vehicle access.

The mobile device 10 is in the form of a smartphone having a touch-sensitive screen 11 on which can be displayed user-interface (UI) elements. These can communicate a state of the mobile device 10 (or system 1) to a user. The UI elements also provide a means by which a user can input information to the mobile device 10. This is done via interacting with those UI elements—for example via a touch-interaction with the touch-sensitive screen 11. The UI elements include a virtual electronic keyboard, as is known in the art, for inputting data such as alphanumeric characters. A range of non-limiting exemplary UI elements are shown in FIGS. 4 to 9 each of which show a mobile device 10 configured by the app 21 to display such UI elements via the screen 11.

FIG. 2 is a schematic block diagram of the mobile device 10 of FIG. 1. The mobile device 10 comprises a wireless communication module 12 for interfacing with the network 2, a processing module 13, and a memory module 14. The mobile device 10 also comprises a sensor set 15—as typically found on most smartphones—the operation and use of which is well-known to those skilled in the art.

By way of non-limiting example, the sensor set 15 comprises a rear camera 15*a*, a front camera 15*b*, and a reference-based positioning module 15*c* in the form of a GPS module. The GPS module 15*c* allows the mobile device 10 to infer an absolute position of the mobile device 10 on Earth, and moreover, can provide a stable and highly reliable timing reference in a manner known in the art.

The memory module 14 is structured so as to transiently or persistently store data, and is where an operating system, file system and applications of the mobile device 10 are stored. Applications, such as the app 21 are retrieved from the memory and passed to the processing module 13 for execution at run-time.

The mobile device 10 further comprises other functional components that are typically common in smart-phone and tablet devices, but are not explicitly and individually shown in the drawings. By way of non-limiting example, these other components include other members of the sensor set 15, such as an NFC (near-field communication) component, a light intensity sensor, a proximity sensor and a compass. A battery, a timer, audio transducers, tactile transducers (e.g. vibration transducer), and a clock are also provided. The components of the mobile device 10 are functionally and communicatively linked to one another as schematically indicated by the dotted lines in FIG. 2. The mobile device 10 may also comprise additional communication modules (e.g. Wi-Fi, BLE/Bluetooth, cellular etc.), to allow communication with other components or sub-components of the system 1.

It should also be noted that one or more communication modules may also act as sensors—in particular location sensors. This can be achieved via detecting the presence and proximity of communication signals (e.g. via time-of-flight, or signal strength). For example, the approximate location of a mobile device 10 may be inferred via the known location of a cellular communication tower via which the wireless communication module 12 of the mobile device 10 may be communicating.

In certain variants and extensions of the present embodiment, mobile devices can include devices integrated with a vehicle. For example, the mobile device may be an integrated component of a "connected car" that has similar functional capabilities—such as to connect wirelessly with the network 2, and also self-localize via a positioning module.

Referring back to FIG. 1, the system 1 is configured to make the application 21 (or "app" 21) available for download on to the mobile device 10. The provision of the app 21 is ideally via the network 2 from the third-party application hosting platform 20. In some examples, a hyperlink or similar may be provided via the UI elements of the mobile device 10, which—when selected by a user—guides the mobile device 10 to the location of the appropriate application hosted by the app hosting platform 20. This can then be downloaded via the wireless communication module 12 on to the memory module 14 of the mobile device 10.

The app 21, when run or managed by the mobile device 10, and typically in conjunction with the app hosting platform 20, is configured to automatically detect when the application requires updating, and either automatically updates itself, or may first prompt a user to affirm that an update should take place.

The execution of the app 21 provides functionality otherwise not available to that mobile device 10. In particular, the app 21 provides some of the functionality of the system and method of authorizing transactions.

The app 21 controls the touch-sensitive display screen 11 to present user interface (UI) elements that allows interactivity between a user of the mobile device 10 and the rest of the system 1, and the central server 3 in particular. By way of overview, the app 21 facilitates user account registration with the central server 3, provides feedback to the user about the status of a transaction authorization process, and can receive inputs from a user that may be used to control the transaction authorization process.

The transaction authorization process is governed predominantly by the central server 3. The central server 3 comprises a database 30 which holds a set of user accounts in a secure and encrypted format, each user account being unique to a corresponding user of the system 1 and associated mobile device 10.

As discussed in relation to FIG. 3, each user account stores registration data including transactional data, a set of user-identifying features, and mobile-device-identifying data. Login credentials, such as a username and password, are also stored, as well as other credential data such as name and address that can be used for verifying the identity of a user and their authority to initiate a payment transaction.

Such registration data is collected via a registration process. This typically occurs after the app 21 is first downloaded by a user on to the mobile device 10 and executed to generate a new user account. It is also possible for a user to generate a new user account via other means, for example via a web interface. Naturally, if a user already has a user account established with the central server 3, then the registration process has already taken place, and so a user merely needs to provide their login credentials to the app 21 to access or update it. Specifically, the providing login credentials to the app 21 on a mobile device 10 associates that mobile device 10 with the user account linked to those login credentials. In certain embodiments, this may disassociate any previous mobile devices 10 from the user account to ensure that location updates are provided from a single mobile device. Furthermore, previous mobile devices may be automatically logged out of the user account, if a more recent mobile device is used to log in. Nonetheless, in alternatives, it may be possible to maintain the association of two or more mobile devices with a particular user account.

If a new registration process is initiated, the app 21 controls the mobile device 10 to collect registration data to form part of a new user account. In the present embodiment, this includes issuing guidance to the user to collect registration data of the correct type, format and quality.

FIGS. 4 to 9 show the mobile device 10 under the control of the app 21. UI elements generated by the app 21 are displayed on the electronic touch-sensitive screen 11 of the mobile device, and are arranged to issue instructions and/or record the actions of the user to collect registration data to populate a corresponding user account.

In particular, the app 21 configures the mobile device 10 to issue a prompt 11b to the user to enter payment data. This includes a set of details associated with a payment card, including the alphanumeric data borne by a payment card.

Alternative options for providing such payment data are provided by the app 21—this can be done manually, or via capturing an image of the payment card. For example, with reference to FIG. 4, the app issues instructions 11b to enter, using a virtual keyboard 11a displayed on the electronic screen 11 of the mobile device 10, such alphanumeric data. Different character input fields 11c are provided, and each field includes a label 11d. This guides the user to enter the correct information for the appropriate fields. Alternatively, the user may instead select a SCAN CARD UI element 11e to provide payment data.

Figures 4, 5, 6, 7:
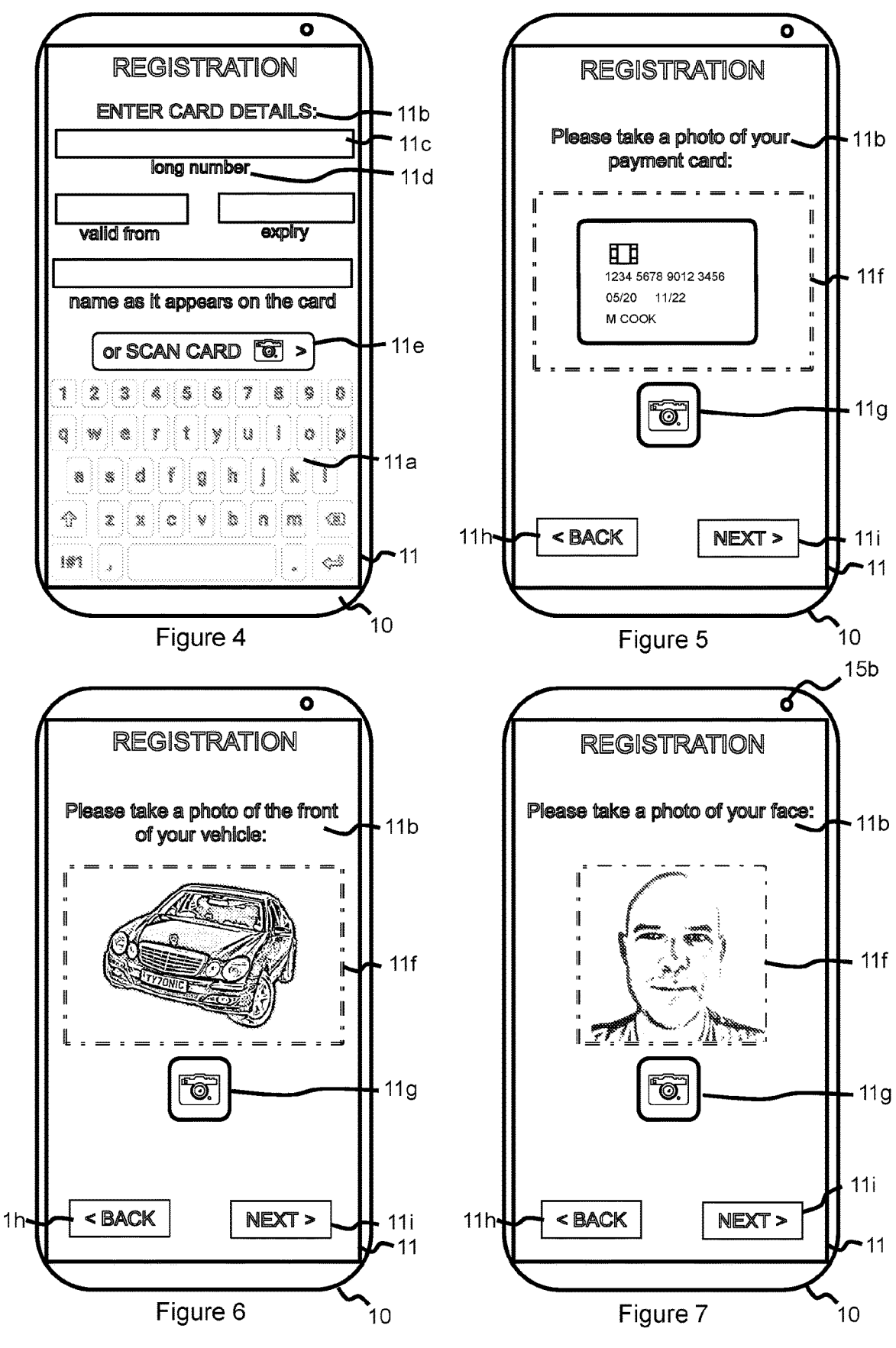

With reference to FIG. 5, the app 21 may configure the mobile device 10 to issue instructions 11b to guide a user to capture an image of the payment card. Specifically, the app 21 enables a rear camera 15a of the mobile device 10 to provide a live camera view 11f to let a user align the payment card with the view of the camera 15a, and then the capture UI element 11g can be selected by the user to capture an image of the payment card.

Once captured, the app 21 configures the mobile device 10 to run a character recognition process in order to extract from the image of the payment card such relevant alphanumeric data so that the image need not be stored or transmitted. Additionally, the extracted alphanumeric data can be displayed, via the electronic display, to the user to allow the user to approve that the character recognition process has been successful, or else retry it, or select a BACK UI element 11h to return to manual entry of such payment details. The NEXT UI element 11i progresses the registration collection process where the app 21 further controls the mobile device 10 to obtain user-identifying features that are linked to the user-identifying assets 9.

Referring to FIGS. 6 and 7, instructions 11b and UI elements 11f, 11g are presented by the app 21 to guide a user to capture images of user-identifying assets 9—such as the front of a vehicle 9b of the user (FIG. 6, using the rear camera 15a), and the face of a user 9c (FIG. 7, using the front camera). Each of these images are sent to the central server 3 and stored within the user account, classified under a corresponding predetermined category (e.g. "user vehicle" or "user face").

Naturally, as an image of the front of the vehicle 9b includes a corresponding vehicle registration mark then, so long as the image taken of the front of the vehicle is of sufficient quality to determine the VRM, this can make a separate step to capture or manually enter the VRM redundant.

Nonetheless, if such a step is required, it can be conducted in a very similar way to the collection of payment card data—i.e. alphanumeric data associated with a VRM can be entered manually, or via character recognition. Again, manual entry can be performed by the app 21 prompting the user to enter, using a virtual keyboard displayed on the electronic screen 11 of the mobile device 10, an alphanumeric string that corresponds to the vehicle registration mark 9a. Alternatively the mobile device 10 may be configured by the app 21 to enable the rear camera 15a to capture an image of the vehicle registration mark and apply a character recognition process to extract the alphanumeric string from that image.

It should be noted that, in the present embodiment, character recognition processes to extract the alphanumeric strings from images of the plate bearing the vehicle registration mark or the payment card are carried out on the mobile device 10. However, in alternative embodiments, images can be transmitted to the central server 3 (or another image processing entity) to perform this function. Regardless of where a character recognition process is carried out, the mobile device 10 and/or the central server 3 can receive and utilise the data that is derived from a character recognition process.

Notably, the central server 3 is configured to receive and store as part of a user account unique to the mobile device, a set of user-identifying features, including an image of a user-identifying asset (i.e. face and/or vehicle), and alphanumeric information corresponding to a vehicle registration mark—which is derived from the image of vehicle bearing that VRM. Similarly, transactional data, in the form of user payment card data, is also stored. Transactional data for payment may take the form of bank account details, PayPal® credentials, etc.

An additional step, prior to the storage of such data as part of the user account, is to independently verify that the set of user-identifying features, and transactional data is correct, of sufficient quality or otherwise faithful to an expected standard. To this end, such data is subject to data fidelity tests. This may be carried out on the server 3, on the mobile device 10 under control of the app 21, and/or via a separate component of the system 1.

For example, upon receipt by the central server 3 of the payment data, the central server 3 transmits the payment data (or a hash thereof) to the payment authority 100 with a request to verify that the payment data 100 corresponds to the payment data held by the payment authority 100 as part of its pre-validated dataset. In response to the request from the central server 3 the payment authority 100 transmits a response approving or denying the fidelity of the payment data 100. If the payment data is approved by the payment authority 100, then the central server stores the payment data within the corresponding user account. Furthermore the central server 3 may issue a payment approval message to the mobile device 10 from which the payment data was originally received. The mobile device 10, as configured by the app 21, can then issue a payment approval notification on the electronic screen 11 as feedback to the user of whether the payment data, as originally input by the user, is valid. If it is invalid then the user is provided with another opportunity to re-enter the payment data.

Another similar data fidelity test concerns the VRM. Specifically, the alphanumeric string representing the vehicle registration mark is sent to the central server 3, where prior to committing the VRM to the corresponding user account, the central server 3 transmits the alphanumeric string to the vehicle registration authority 200 together with a request to verify validity of the vehicle registration mark. In reply, on the basis of its pre-validated data set, the vehicle registration authority 200 issues a response approving or denying the validity of the VRM. If valid, then the response may also include details of the vehicle that are registered with the vehicle registration authority 200 under that VRM. These details may include the colour, make and model of that vehicle. These details, and the validated VRM, can thus be stored in the user account accordingly. In a similar manner as described above in relation to the payment data, the central server 3 may further issue a VRM approval message to the mobile device 10 from which the VRM was originally received. The mobile device, as configured by the app 21, can then issue a VRM validity notification on the electronic screen 11 as feedback to the user of the validity of the VRM.

Referring to FIG. 8, the mobile device 10 can be configured to display on the screen 11, the extracted VRM 11*j*, the photographic image 11*k* taken by the user of the vehicle from which the VRM has been extracted, and a set of details 111 obtained from the vehicle registration authority 200 that include the colour, make and model of the vehicle. These are displayed as further feedback to the user: a mistyped VRM may still be a valid VRM in relation to a different make and model of vehicle, and so displaying this to the user can facilitate a cross-check. To this end, the VRM validity notification may include a user approval prompt (i.e. NO/YES UI elements 11*m*, 11*n*)—the result of which can be sent again to the central server 3 as a way of providing further verification that the user has indeed correctly entered the appropriate VRM.

Alternatively, a cross-check can be performed at the central server 3. Specifically, the central server 3 can process the image of the front of the vehicle 9*b* in order to determine from that image the likely colour, make and model of the vehicle. This can be compared with the colour, make and model of the vehicle as reported by the vehicle registration authority 200. If a match is determined by the central server 3, then the VRM can be confidently stored within the corresponding user account. If a mismatch is detected, then the central server 3 can issue a mismatch message to the mobile device 10, and then the mobile device 10 can issue, via the electronic screen 11, a mismatch notification to the user including a suggestion that the VRM be entered again.

Cross-checking can therefore include comparing one user-identifying feature with another, and/or comparing information derivable from an image of a user-identifying asset against a pre-validated data set—such as those held by a vehicle registration authority 200 or a payment authority 100.

A further data fidelity test, carried out by the central server 3, involves detecting if an image that relates to a user identifying asset 9*b*, 9*c* has been captured in a way that allows features of that asset to be extracted for the purpose of image feature matching—for example, as carried out by the feature matching module 7. This includes a simple image resolution check, and a more sophisticated image feature detection process.

The latter includes determining that the image is likely to be that of a vehicle or a face as appropriate. As each user-identifying feature submitted by the mobile device 10 to the central server 3 is associated with a predefined category of asset, this allows data fidelity test to include determining that a user-identifying feature is a valid example of the category with which it is associated.

Again, a warning can be issued to the user, via the screen 11 of the mobile device 10, if the fidelity of any of the user-identifying features are insufficient, with an option to provide those features again.

In any case, a corresponding user account can be established (or updated) depending on the outcome of the fidelity check. In the current embodiment, the data fidelity checking process is predominantly carried out by a data fidelity checker that is virtually implemented on the central server 3. However, in alternatives, the data fidelity checker may be separate from the central server 3, and there may be multiple data fidelity checkers, each checking the fidelity of different data. For example, a data fidelity checker, at least in part, may be provided via the mobile device 10 as configured by the app 21. Specifically, the app 21 may configure the mobile device 10 to verify check digits of a payment card prior to sending such transactional payment data to the central server 3.

Thus, a reliable set of user-identifying features and transactional data can be maintained within a user account uniquely associated with a corresponding mobile device.

It should be noted that while the embodiment primarily envisages that a mobile device is conveniently used to provide the user-identifying features and transactional data, in alternatives, such data can be provided by a different computing device so long as the user account is also uniquely associated with a corresponding mobile device 10.

Each user account also comprises location data, including the location of the associated mobile device 10, and a location update time for indicating when that location of the associated mobile device 10 was updated. To this end, the mobile device 10 is configured by the application 21 to determine and transmit its location to the central server 3 so as to update the location data of the associated user account. The location update time may be provided by the mobile device (e.g. when the location was determined), by the server 3 (e.g. when the location update was received by the server 3) or another suitable timestamping method.

The mobile device 10 may determine its location in a variety of ways, as known in the art, for example via a GPS module, or proximity to a cellular tower. But each way typically has its own precision and accuracy. To account for this, the mobile device 10 may be configured by the application 21 to determine and transmit it location (i.e. as a point on the surface of the Earth) together with a tolerance value. This could be in the form of an estimated horizontal accuracy of the mobile device 10 relative to that point. This could simply be a radial distance, thereby indicating that the mobile device is within a stated radius of that point.

In various embodiments location updates can be provided by the mobile device 10 in response to receiving a location request from the central server 3, according to a location update rule and/or according to a schedule codified by the app 21.

Location update rules may include those governed by the internal state of the mobile device 10 as determined by the app 21—for example, location updates can be prevented if the determined battery level of the mobile device 10 is below a predetermined value. Conversely, location updates can be controlled by the app 21 to be made more frequent if it is detected that the mobile device 10 is moving. This may be by registering a significant change between the location previously detected, and the current location, or triggered by movement outside a geofenced area. Thus, the mobile device 10 as controlled by the app 21 can drive the location updates.

In the present embodiment, a location update is issued by the mobile device 10 to the central server 3 via a combined approach. By default, the mobile device 10 issues a location update periodically, simply according to a schedule—one location update every 30 minutes—unless a location update request is received.

In further alternatives, location updates may be driven by the central server 3. More specifically, the central server 3 is configured to maintain each user account by determining which user account has a location update time that is older (relative to a current time) than a threshold amount and, in response, send a location request to the mobile device associated with that user account. The threshold amount may be as infrequently as 24 hours, but is preferably 12 hours, and more preferably as frequent as hourly. Naturally, this depends on the capability of the central server 3 to issue a particular rate of location update requests to all mobile devices of the system 1.

Again, the central server 3 can also control the update location request with appropriate rules similar to those already described.

In any case, at the appropriate time for sending a location update, the mobile device 10 is configured by the application to activate the positioning module 15c to determine the location of the mobile device for transmission to the central server 3, and following transmission instruct the positioning module 15c to enter into a low-power sleep mode so as to conserve energy.

The location of the mobile device and the set of user-identifying features, as stored in the user account are subsequently used for transaction authorization, and so permit service provision at the service location 40.

Referring back to FIG. 1, the example service location 40 shown is that of a vehicle refuelling station. Here, the image capture device 4 is positioned with its field of view 4a across the area of the service location 40 used for refuelling. The service location 40 has four service dispensers in the form of fuel dispensers 51, 52, 53, 54. Additionally four service zones 41, 42, 43, 44 are contained within the part of the service location 40 within the view of the image capture device 4. Each service zone 41, 42, 43, 44 is associated with a respective adjoining fuel dispenser 51, 52, 53, 54, as shown in FIG. 1.

The service location controller 5 is in communication with each of the fuel dispensers 51, 52, 53, 54 such that information can be exchanged between them. In particular, the fuel dispensers are able to communicate to the service location controller 5 an amount of fuel dispensed, and the service location controller 5 can send operation parameters to the fuel dispensers—such as a signal to enable or disable their fuel-dispensing operation, and a maximum authorized quantity/value of fuel to be dispensed. The fuel dispensers 51, 52, 53, 54 each include one or more display units that, as well as containing standard numerical displays of the value and quantity of fuel dispensed, also include an additional status indicator that indicates to a user the status of an authorization to dispense fuel in response to operation parameters received from the service location controller 5. The status indicator of each fuel dispenser may provide a simple status indication—for example, a red or green light to indicate whether the fuel dispenser is disabled or enabled respectively. The status indicator may additionally provide an indication of a maximum transaction value and/or quantity of fuel to be dispensed. In alternatives, the status indicator may provide user feedback via audio cues.

Generally, the service location controller 5 receives a transaction authorization from the central server 3, and unlocks (or advises unlocking of) the fuel dispensers as will be described further below.

The image capture device 4 is configured to capture a sequence of images, including those that contain any user-identifying assets 9 that enter the service location 40 within the field of view 4a of the image capture device 4.

In the present embodiment, the image capture device 4 has the feature extraction module 6 integrated with it. The feature extraction module 6 is configured to automatically apply a character recognition process to the images captured by the image capture device 4 thereby to derive the alphanumeric string of any vehicle registration marks present in those images. The alphanumeric string is then transmitted to the central server 3.

Thus, the feature extraction module 6 is configured to receive images from the image capture device and process them to extract a set of features including an alphanumeric string corresponding to the VRM. This is used for determining a match with a user account based on the alphanumeric strings stored in that account corresponding to the VRM.

In other variants of the present embodiment, the images captured by the image capture device 4 may be transmitted directly to the central server 3, instead of or in combination with the alphanumeric string derived from it. This uses significantly more network bandwidth, but allows the central server 3 to perform direct image comparison as will be described later. In such a variant, feature extraction is via a feature extraction module 6 virtually-implemented on the central server 3. In further alternatives, the feature extraction module 6 may be integrated with the image capture device 4 of some service locations, but not others—the latter relying on a server-implemented feature extraction module 6, if required.

Nonetheless, it is generally advantageous for the image capture device 4 and at least a basic feature extraction module 6 to be integrated with one another. Under certain modes of operation, this can not only minimise network bandwidth usage, but also improve reliability: After the image capture device 4 and the feature extraction module 6 have together extracted a feature, such as a VRM, from an image, there is a relatively high likelihood that images captured by the image capture device 4 immediately afterwards will also include the same feature. i.e. the same plate bearing the VRM is likely to feature in a sequence of images. Naturally, this depends on factors such as the frame-rate of the image capture device, but it is expected that this will often be the case as frame-rates will practically need to be around 1 frame-per-second or greater.

Rather than continually and repeatedly resubmit the same information for every frame captured by the image capture device, a mode of operation of preferred embodiments is one in which the feature extraction module 6 is configured to register the immediate recurrence of the extracted feature, and limit the frequency at which those image-derived features are sent to the central server 3. For example, rather than send the same extracted VRM at the same frequency of the frame-rate (e.g. every second), the feature extraction module 6 limits resending of the extracted VRM to once every three minutes.

In other words, if a user-identifying asset is within the field of view 4a of the image capture device 4 over a long period, all that may be required is for the feature extraction module 6 to send an update to the central server 3 at a predetermined time interval (e.g. every 3 minutes), the update indicating the continued presence of that user-identifying asset within the field of view of the image capture device 4. Advantageously, this can be used by the central server 3 to extend the time limit allowed for a pending transaction to be authorized at the service location 40.

This can also be useful in improving reliability of feature extraction. Uncertainty about an extracted feature can be reduced by using multiple sequential images that feature the same user-identifying asset. Moreover, a further configuration of the feature extraction module is to wait until such a multiple set of images have been received and subjected to a feature extraction process, before sending the extracted feature (e.g. VRM) that is the most likely from that set to the central server 3.

In any case, the central server 3 is configured to receive an image from the image capture device 4 that includes a user-identifying asset, or features derived from that image, and use these to determine a match with a user account. This is based on both image similarity and location similarity.

Specifically, image similarity includes the similarity of features of the image captured by the image capture device 4, and those stored in a corresponding user account. Location similarity, includes the similarity of the known location of the service location (which is fixed and pre-registered with the server), and the location of the mobile device (which is received by the server 3 via location updates as described above).

Advantageously, and as discussed briefly above in relation to FIG. 3, it can be determined with a high degree of certainty that a user is at a service location 40. The user's presence there is verified via two independent routes: the mobile device 10 itself reporting its location, and the image capture device 4 reporting the presence of a user-identifying asset 9 at the service location. Thus, the central server 3 can reliably authorize the use of transactional data associated with the user account of that user.

Determining a match can be achieved by simultaneously considering image and location similarity—for example using fuzzy logic as is known in the art. Alternatively, matching can be determined by first filtering the user accounts based on either image similarity or location similarity. The filtered set of user accounts can then be searched using the other parameter.

In other words, the central server 3 is configured to receive the image from the image capture device 4, or features derived from that image, and in response determine a match with one of the user accounts by firstly filtering the set of user accounts based on either image similarity or location similarity, and then secondly ideally choosing one user account from the filtered set based on the other of image similarity or location similarity.

A filtering configuration of the central server 3 determines which similarity parameter (image or location) is used for filtering first. Furthermore, the central server 3 is configured so that the filtering configuration can automatically change to obtain the most reliable and/or quickest match.

Under an image-first filtering configuration, the central server is configured to receive the image from the image capture device, or features derived from that image, and in response, determine matches with a candidate first set of user accounts based on the similarity of features of the captured image from the image capture device 4, and those of the user-identifying features of the candidate first set of user accounts. The server can then determine a match with at least one of the candidate first set of user accounts dependent on the similarity of the location of each mobile device associated with the candidate first set of user accounts, and that of the service location.

Under a location-first filtering configuration, the central server 3 is configured to receive the image from the image capture device 4, or features derived from that image, and, in response, determine matches with a candidate second set of user accounts based on the similarity of the known location of the service location from which that image originates, and the location of the mobile device of the candidate second set of user accounts. This is because images from the image capture device 4 (or features derived therefrom) are provided together with a service location identifier, which can be used by the server 3 to look up the corresponding geographical location of the service location pre-registered with the server 3. Thereafter, the central server 3 is configured to determine a match with one of the candidate second set of user accounts dependent on the similarity of features of the captured image, and those of the user-identifying features of the candidate second set of user accounts.

A refinement to each of these filtering configurations comprises the server transmitting a location request to mobile devices associated with the candidate set of the user accounts obtained from the initial filtering action. Responses received from the mobile devices allow up-to-date location data for those accounts to be used in determining a more reliable match.

In either case, image-similarity matching and location-similarity match are both performed to obtain a reliable determination that a user is at a service location.

In the embodiment shown in FIG. 1, a vehicle plate bearing the VRM 9a is the primary user-identifying asset used to determine an image-similarity match. This has benefits associated with speed of matching: this can be done on the basis of a match between one alphanumeric string against another, and so is far quicker and processor efficient for the server to perform for a large dataset (e.g. under an image-first filtering configuration) than, for example, an image-to-image match.

An image-to-image match is more practical for a smaller dataset—and may be performed by the feature matching module 7 under a location-first filtering configuration.

VRM matching has other practical benefits—it facilitates easier deployment of the transaction authorization system 1, as certain service locations may already employ ANPR devices that are able to simultaneously perform the role of image capture device 4 and feature extraction module 6. Thus, without significant adaptation, the main viable output receivable by the central server 3 from such an already-employed ANPR device is the alphanumeric string.

A naive approach is to simply determine a direct match between the two alphanumeric strings, and this approach may be appropriate under a location-first filtering configuration in which location similarity yields a filtered set of user accounts from which a final user account is to be chosen on the basis of image feature similarity.

However, it has been conceived that imperfect string matching is beneficial in the context of the present embodiment of the invention. Images may not be clear, leading to an erroneous derivation of the alphanumeric string. Also, users may initially incorrectly enter a VRM string into their user account, notwithstanding the fidelity tests.

Accordingly, the central server 3 beneficially performs matching of alphanumeric strings by executing a fuzzy string searching algorithm. This is adapted from efficient string searching algorithms as already known in the art. The matching outcome of such algorithms can be controlled by specifying a threshold value for a string distance (i.e. the quantified difference between two strings). The Levenshtein or the Hamming distance are two examples of string distances specified according to such known string matching algorithms, for example.

Thus, a match with at least one of the user accounts can be determined if the string distance, such as the Levenshtein or Hamming distance, as determined by the fuzzy string searching algorithm, is less than a threshold value. The most appropriate threshold value can be determined via trial and error, and is dependent on the filtering configuration employed.

By way of example, if the string distance is considered to lie within a normalized range between 0 and 1—where 0 represents no difference/an identical match, and 1 represents no similarity between strings—in an image-first filtering configuration a threshold value of below 0.45, and more preferably below 0.3 is envisaged to be appropriate.

Additionally, the string matching algorithm employed by the present invention is adapted to take into account more easily confused VRM characters. Characters such as D and O, for example, are more similar and so more easily confusable than X and O. The confusability (or similarity) between each alphanumeric character is designated by a predetermined character visual-similarity table. Furthermore, the table is tailored to the similarity of characters of a font that is standard to vehicle registration plates bearing the VRM. Accordingly, the adapted string searching algorithm of the present embodiment comprises applying a character visual-similarity table, wherein string differences caused by more visually-similar characters result in a smaller string distance.

An additional adaptation to the string searching algorithm of the present embodiment compensates for VRM conventions. For example, in the United Kingdom, modern VRMs consist of seven characters that follow a convention that includes two letters, followed by two numbers, followed by three letters. Certain letters are excluded from certain positions in the string. Such VRM convention rules can be codified as part of the string searching algorithm so that the likelihood of a match is higher for strings conforming to an applied VRM convention, and conversely lower for strings that do not. Specifically, when executing the fuzzy string searching algorithm, VRM convention rules are applied so that string differences caused by unconventional VRM character arrangements result in a larger string distance.

Naturally, in other embodiments or alternatives, different string matching algorithms may be used. Additionally, other feature extraction and matching approaches can be used—instead of, but ideally in combination with VRM string extraction and matching—to allow more reliable image similarity matching.

An image captured by the image capture device 4 may contain a number of different independent features, each of which can be extracted and compared with a corresponding set of identifying features within a user account. A VRM alphanumeric string is one example, but there are others:

For example, the set of identifying features within a user account may include the colour of the vehicle, and its make and model. This information can also be retrieved by the central server 3 from the vehicle registration authority 200 using the VRM data, even if a user has not already provided it.

Accordingly, if the image capture device 4 is able to capture colour images, the feature extraction module 6 can determine a colour (or range of likely colours) of a vehicle. The feature extraction module 6 can also be configured to extract the likely make and model of a vehicle, especially based on the shape and appearance of the front of the vehicle, which typically has a greater number of distinguishing features (e.g. the grill, headlights, and manufacturer badge/logo).

Furthermore, in certain embodiments, image similarity can be determined by image-to-image matching. Using this approach, the image captured by the image capture device 4 is compared with the images that are included as part of the user-identifying features of user accounts.

This relies on the central server 3 applying image processing and recognition techniques. To this end, certain embodiments of the invention may include an integrated feature extraction module 6 and feature matching module 7. This may be implemented virtually on the central server using neural networks, for example. This is particularly relevant for facial recognition. A user account that contains an image of the face of the user 9c as a user-identifying asset can be matched on the basis of the similarity between that image, and the one captured by the image capture device.

In any case, if multiple features are used by the central server 3 for image-similarity matching, then these may be weighted based on their distinctiveness. Once this has been done, a greater number of higher-weighted features extracted from a captured image that are matched to those stored as part of a user account generally corresponds to a higher certainty of that user account being the one associated with the user who is at the service location 40.

Naturally, this also extends to a sequence of images that are captured within a limited period of one another. For example, a vehicle and VRM can be detected in a first image in a sequence, and then shortly afterwards, the face of a user may be detected (e.g. as that user leaves the vehicle to refuel it).

For certain embodiments, an additional user-identifying feature that can be stored in the user account is a display code that is unique to the user account. This display code is capable of being displayed graphically on the electronic screen 11 of the mobile device 10—for example, as a 2D barcode such as a QR code. Accordingly, an image captured by the image capture device 4 of such a display code, as displayed on the screen 11 of the mobile device 10, can be also used as a unique distinguishing image on the basis of which to carry out an image similarity test.

It should be noted that the exact code stored in the user account, and that which is displayed on the corresponding mobile device screen 11 may not necessarily be identical: one may be a derivation of the other (e.g. via a hash, cipher, or other function).

Incidentally, this also applies to other codes or data held at the central server 3 and mobile device 10, and other components of the system, which are intended to correspond to one another. Each component of the system 1 is configured to apply the necessary functions to derive one piece of data from the other. For simplicity however, the same term is used to label both the code, and its derivation.

Therefore, certain user accounts may include a set of user-identifying features that includes display code information (e.g. barcode information) that is derivable from an image of a user-identifying asset (e.g. the image of a barcode). In practice, this image is displayed on the electronic screen of the mobile device 10—e.g. in the form of a barcode—and a user can hold up the screen 11 towards the image capture device 4 to allow the display code to be captured.

To achieve this functionality, a mobile device 10 can be configured by the app 21 to receive a barcode generation command and in response generate a barcode corresponding to the barcode information within the user account associated with the mobile device 10. The mobile device 10 is then configured to display the barcode on the electronic screen 11 of the mobile device 10. A user may be prompted to hold the screen 11 of the mobile device 10 towards the image capture device 4 at the service location 40.

The image capture device 4 can then capture and send an image of the barcode displayed on the electronic screen 11 of the mobile device 10 to the central server 3. The central server is configured to receive the image of the barcode from the image capture device, or features derived from that image (such as the display code itself), and in response determine a match with one of the user accounts.

Thus, alternative methods and means of utilising images of user-identifying assets are possible, and can be used instead of or in combination with one another in various embodiments of the invention to allow the central server to determine a match with one or more user accounts.

The central server 3 of the present embodiment also utilises matching on the basis of location similarity—i.e. the similarity of the known location of the service location 40, and a mobile device location.

As the mobile device is likely to change its position frequently, this determination of location similarity is influenced by time. i.e. it is important for the central server 3 to make a determination of the likelihood of the mobile device 3 being in the same place as the service location 40 at the relevant image capture time.

Accordingly, the central server 3 is configured to perform location matching by calculating a time difference between a time of capture of the image of the user-identifying asset, and the time of the mobile device location update. Furthermore, the central server 3 is configured to calculate a distance between the known location of the service location, and that of the mobile device location, and determine the probability of the mobile device travelling the calculated distance within a period corresponding to the calculated time difference. From this, the central server 3 is configured to filtering out user accounts where the determined probability is below a predetermined probability value.

In various embodiments, the predetermined probability value, while determined by the central server 3, may be determined differently under different circumstances. While travelling large distances in short periods of time is generally more unlikely than travelling small distances over large periods of time, this is dependent on travel circumstances such as traffic conditions. Accordingly, the central server 3 is further configured to define the predetermined probability value in response to at least one of: time of day, day of the week, and traffic conditions between or around the known location of the service location, and that of the mobile device location. Traffic conditions may be based on historic travel conditions at a particular time or day, or obtained via traffic update systems.

One of the additional filtering steps that can be carried out by the central server 3 of various embodiments is filtering out user accounts that have a mobile device location update that is older than a threshold amount—i.e. location updates being too far in the past to be reliable. Advantageously, the location update threshold amount can be set to greater than the period between expected location updates (e.g. as driven by issuing location requests to mobile devices). Thus, further processing need not be carried out on mobile devices that have become dormant or otherwise unresponsive. This improves the efficiency of location matching.

The mobile device 10 generally transmits its location to the central server 3 via the Internet using its wireless communication module (whether via a cellular, WiFi or other such communication). This can cause issues where such internet connectivity is unavailable. However, various embodiments of the present invention are able to provide a means by which the mobile device can communicate its location via an alternative arrangement—specifically using the image capture device 4. This is compatible with the previously-described use of a barcode as a user-identifying asset:

A mobile device 10 may be configured by the application 21 to do this by receiving a barcode generation command and in response generate the barcode, at least part of which is dependent on the determined location of the mobile device 10.

The barcode generation command, in this instance, also activates the positioning module 15c of the mobile device 10, and it is from this that the location of the mobile device 10 can be determined and used to generate a barcode which encodes that determined location. Advantageously, a positioning module (e.g. GPS) does not necessarily need internet connectivity to detect the location of the mobile device, and so even though a mobile device 10 lacks internet connectivity, it is still able to self-localize.

Furthermore, as an additional (or alternative) security measure, the mobile device 10 may be configured by the application 21 to receive a barcode generation command and in response generate the barcode, at least part of which is dependent on the time of generation.

In this way the barcode presented to the image capture device 4 provides unambiguous evidence to the central server 3 of the identity and location of the mobile device 10 at a given time, allowing service provision to be authorized at that service location.

Furthermore, the barcode that is generated can be configured to be different for every time and/or location, therefore removing the security risk that a malicious third party copies the barcode in order to pose as a user.

Barcodes can also be used in alternative ways. In certain embodiments of the present invention, one or more barcodes may instead be provided at the service location 40. For example, at a fuel dispensing service location, a unique barcode may be provided at each service zone 41, 42, 43, 44. This can be scanned by a user to unlock the use of the corresponding fuel dispenser 51, 52, 53, 54.

In other words, the system 1 comprises barcodes that are uniquely associated with the service location, or individual service zones 41, 42, 43, 44 within that service location 40.

In such alternative embodiments, the mobile device 10 is configured by the application 21 to receive from a user a scan command and in response activate a camera of the mobile device to scan the barcode. Scanning the barcode allows the mobile device to derive from the barcode a code uniquely associated with the service location (and/or zone). This code is sent by the mobile device 10 to the central server 3 as evidence of the mobile device being at the service location 40 (or zone) associated with that barcode.

The central server can therefore be configured to receive the code from the mobile device and—after determining a match with a user account associated with that mobile device—authorize use of the transactional data of that user account to permit service provision at the service location 40 or service zone 41, 42, 43, 44. Naturally, this can be used as a way of cross-checking the other above-described methods of verifying that a user is at a service location 40.

The central server 3, as so far described above, determines a match with a user account, and then authorizes the use of transactional data associated with that user account. While this may be automated in certain embodiments, a further useful feature of the present embodiment is to first obtain a verification from a user that the determined match with a user account is correct. Advantageously, this prevents incorrect use of transactional data.

In the present embodiment, this is achieved by the central server 3 being configured to determine a match with one of the user accounts, and transmit a match message to the mobile device associated with that user account. The mobile device 10 is configured by the application to receive the match message, and in response issue a notification to a user of the mobile device 10. This is typically a pop-up notification displayed on the electronic screen 11 of the mobile device 10.

FIG. 9 shows the mobile device 10 under the control of the app 21 to display an example match notification on the electronic screen 11. This indicates to the user the determination of a match and readiness of the central server 3 to authorize use of the transactional data to perform a transaction, thereby permitting service provision at the service location.

The notification includes details of the user-identifying asset that was visually detected—in this case the VRM of the vehicle 11o, and also details of the location at which that user-identifying asset was detected. The latter includes a text location descriptor 11p, and a map 11q of that location. This information aids user decision-making, and so speeds up user response times. To facilitate the display of this information, the match message sent by the central server at least comprises an identification of the service location, and the mobile device is configured by the application to receive the match message, and in response issue a notification to a user of the mobile device to identify the service location.

In certain variants of the present embodiment, the notification displayed may not necessarily require user interaction. A default operation may be to proceed with use of the transaction, absent of user intervention. To this end, the mobile device may be further configured, after a time-out, to send an approval response to the central server 3.

However, the present embodiment, by default, requires user interaction to approve the transaction authorization to begin. Specifically, the mobile device 10 is configured by the application 21 to receive the match message from the central server 3 and in response display, on the electronic screen 11 of the mobile device 10, at least one user-interactable approval element for receiving a user interaction to specify approval of the transaction.

As shown in FIG. 9, a pair of user-interactable approval elements 11r, 11s are provided. Selection of the NO element 11r issues a denial response to the central server for preventing authorization of a transaction. Selection of the YES element 11s issues an approval response to the central server for approving such a transaction.

Thus, the mobile device 10 is further configured to send an approval response to the central server 3 dependent on user interaction with the user-interactable approval element, and this can be in the form of a simple approval or denial as shown in FIG. 9.

In alternative embodiments, or extensions, certain conditions may be further specified along with an approval. For example, a user-interactable approval element may be provided that allows a user to specify a maximum transaction value.

Nonetheless, the central server 3 is configured to authorize use of the transactional data of the user account to perform a transaction depending on the approval response received from the mobile device.

It should be noted that it is important for the central server to filter the number of candidate user accounts to as few as possible (and ideally one account) prior to issuing a match message. Too many false positive notifications are likely to lead to a poorer user experience, and undermine user trust in the system 1 to securely handle transactions. This would also take up significant network bandwidth.

Thus, via location and image similarity matching, and user notification and approval, the central server 3 can be reliably and conveniently configured to authorize use of the transactional data of the user account to perform a transaction, thereby to permit service provision at the service location 40.

In the embodiment shown in FIG. 1 the authorized use of transactional data includes the central server 3 being configured to transmit a user account match verification to the service location controller 5. The service location controller 5 is configured to receive a user account match verification from the central server and in response provide access to a service at the service location 40. In the present embodiment, where the service location controller 5 is in communication with a service dispenser such as a fuel dispenser 51, 52, 53, 54, this includes unlocking an appropriate fuel dispenser for use by the user that is associated with the user account.

This can be from the perspective of unlocking a set of fuel dispensers located at a particular zone or, in a further extension of the present embodiment, unlocking only a specific one of that set of fuel dispensers. For example, the user account may be restricted to the use of a particular fuel type (e.g. petrol or diesel). This may correspond to the appropriate fuel type of a vehicle in the user account. Accordingly, the central server 3 can be configured to transmit to the service location controller 5, together with the user account match verification, a fuel type. In response, the service location controller 5 is configured to provide access to only fuel dispensers of that fuel type. This can be advantageous from the perspective of preventing misfuelling of vehicles.

In alternative embodiments the service location controller 5 may provide access to a service in another way. For example, the service location controller 5 may be in communication with a barrier arm that provides vehicle access to a car parking facility.

Another example is the service location controller 5 may have a staff interface, and communicate with staff at the service location to grant access to a service. To assist the staff granting access, the user account match verification received from the central server may include identifying features of the user (e.g. an image of their face 9*c* or vehicle 9*b*), that are displayed on the staff interface. This can allow staff—typically in a position to manually survey the service location 40—to enable or unlock the correct fuel dispenser at which the identifiable user (or their vehicle) is positioned.

An additional feature of certain embodiments is that the staff interface may be granted temporary access to the personal data silo 8 associated with the user account. This may include preference information about how the user prefers delivery of a service. For example, if the service location 40 is a drive-through restaurant, the staff interface may display a preferred meal of the user.

In the embodiment shown in FIG. 1, the central server 3 is configured to include with the match verification a fuel dispensing value. The service location controller 5 is configured to receive such a match verification, and communicates with a fuel dispenser 51, 52, 53, 54 at the service location to control the fuel dispensed by the fuel dispenser in dependence on the fuel dispensing value. Moreover, the status indicators mentioned above are controlled to indicate a status of the authorization to the user.

One challenge is the automated enabling of the correct fuel dispenser. More than one fuel dispenser may be provided at a service location 4, as with the present embodiment shown in FIG. 1. To do this, the system of the present embodiment includes, as part of the central server 3, a virtually-implemented image-based position detector. In alternatives, this may be a separate component, or part of the image capture 4.

The image-based position detector determines which service zone is occupied by the previously detected user-identifying asset (i.e. the vehicle linked to the user account matched), and enables the service dispenser associated with that service zone. Naturally, this relies on the image capture device 4 having a field of view of the relevant service zones 41, 42, 43, 44, as is the case with the present embodiment of the invention.

As different service locations have different arrangements and relative positioning of zones, image capture devices etc., then the image-based position detector is specifically set up for each service location. This may require a system administrator to define the service zones at each service location (e.g. drawing service zone boundaries on a sample image from the image capture device at that service location), and associating a unique service dispenser to each zone. This creates zone definitions for each service location.

Accordingly, the image-based position detector is configured to receive a definition of a set of service zones, the definition being associated with the image capture device at a service location, each service zone having associated with it a unique service dispenser, such as a fuel dispenser. The image-based position detector is then configured to receive an image from the image capture device, and determine from the received image the occupation by a user-identifying asset, such as a vehicle, of one of the set of service zones. Thereafter, the image-based position detector can authorize the service dispenser within the determined one of the set of service zones to dispense a service as part of the transaction authorizes by the central server.

To be effective, the system 1 must also withdraw a transaction authorization after a predetermined timeframe, if a transaction does not go ahead. This improves the security of the system, and minimises the memory and processing burden of handling an increasing number of potential transaction threads. Accordingly, the central server 3 is configured to authorize use of the transactional data of the user account with which a match has been determined within a predetermined timeframe. This is timed relative to a capture time of the captured image used by the server to determine a match with that user account. The exact timeframe used may vary across different service locations, but is envisaged in most cases to be less than ten minutes.

In certain embodiments, the predetermined timeframe may be extended via issuing an extension request to the mobile device 10, which displays an extension notification, receives a user response, and sends the response to the central server 3 so as to extend (or not) the timeframe. This is performed in a similar manner as explained above in relation to FIG. 9, regarding the match notification and approval response.

As discussed above not all of the components described above in relation to FIG. 1 are necessarily part of other embodiments of the invention. For example, in one extension or variant of the first embodiment shown in FIG. 1, a service location of a different type may be provided instead of or in addition to that shown in FIG. 1.

For example, the service location may be in the form of a vehicle parking facility 40. For this example of service location 40, no service location controller 5, service dispensers 51, 52, 53, 54, nor service zones 41, 42, 43, 44 are necessarily required. Instead the image capture device 4, is positioned with its field of view across an entry and exit path of the service location 40. In this situation, the central server 3 is configured to determine a match with one of the user accounts, as described above. This is via the similarity of the reported location of the mobile device to the service location, in conjunction to visually identifying the presence of the user. The latter is typically by detecting the user vehicle passing via the entry/exit path using an image capture device. A first detection (e.g. of the front of the vehicle, arriving at the parking facility) can be used to trigger a nominal authorization to use the transactional data of the user account. A second detection (e.g. of the rear of the vehicle, leaving the parking facility) can govern how that transactional data is to be used—in particular, utilising the time difference between the first and second detections to determine a parking time, and therefore a parking fee to be paid using the transactional data.

Although the invention has been described in conjunction with specific embodiments thereof, it is evident that many alternatives, modifications and variations will be apparent to those skilled in the art.

Accordingly, it is intended to embrace all such alternatives, modifications and variations that fall within the scope of the appended claims.

What is claimed is:

1. A transaction authorization system comprising a plurality of mobile devices each configured by a transaction authorization application, a central server, and an image capture device, having a feature extraction module, wherein:

the central server is configured to maintain a set of user accounts, each associated with a corresponding one of the plurality of mobile devices, each user account comprising:

a set of user-identifying features, including at least one of: an image of a user-identifying asset, and information that is derivable from an image of a user-identifying asset;

location data, including the location of the associated mobile device, and a location update time for indicating when that location of the associated mobile device was updated; and transactional data for performing a transaction;

the system is configured to execute a set of sequential operations for transaction authorization, comprising:

(i) activating, at an appropriate time for sending a location update, a positioning module of one of the plurality of mobile devices to determine the current location of the mobile device;

(ii) determining a location of the mobile device, via the positioning module;

(iii) transmitting, by the mobile device, in response to step (i) and (ii), the determined location to the central server so as to update the location data of the user account with which that mobile device is associated;

(iv) following transmission, placing the positioning module of the mobile device into a low-power sleep mode so as to conserve energy:

(v) automatically capturing and transmitting, by the image capture device located at a service location, an image of a user-identifying asset;

(vi) receiving, by the central server, after completion of step (v), the image from the image capture device, and features derived from the image from the image capture device, (vii) determining, by the central server, subsequent to steps (i)-(vi), a match with one of the user accounts dependent on:

image similarity, including the similarity of features of the captured image, and those of the set of user-identifying features; and location similarity, including the similarity of the known location of the service location, and the location of the mobile device by:

calculating a time difference between a time of capture of the image of the user-identifying asset, and the time of the mobile device location update;

calculating a distance between the known location of the service location, and that of the mobile device location;

determining the probability of the mobile device travelling the calculated distance within a period corresponding to the calculated time difference; and filtering out user accounts where the determined probability is below a predetermined value; and (viii) authorizing, by the central server, only upon determining a match in step (vii), use of the transactional data of the user account with which a match has been determined to perform a transaction, thereby to permit service provision at the service location within a predetermined timeframe from a capture time of the captured image used by the server to determine a match with that user account.

2. The system of claim 1, wherein the central server is configured to receive at least one of: the image from the image capture device, and features derived from the image from the image capture device, and in response determine a match with one of the user accounts by firstly filtering the set of user accounts based on one of image similarity and location similarity, and then secondly choosing one user account from the filtered set based on the other of image similarity and location similarity.

3. The system of claim 1, wherein the central server is configured to maintain a set of user accounts by determining user accounts that have a location update time that is older than a threshold amount, and in response send a location request to mobile devices associated with those user account.

4. The system of claim 1, wherein each of the plurality of mobile devices is configured by the application to determine and transmit their location to the central server in response to at least one of: receiving a location request from the central server, and according to a location update rule, and according to a location update schedule.

5. The system of claim 1, wherein the central server is configured to:

receive at least one of: the image from the image capture device, and features derived from the image from the image capture device, and in response, determine matches with a candidate first set of user accounts based on the similarity of features of the captured image, and those of the user-identifying features of the candidate first set of user accounts; and determine a match with one of the candidate first set of user accounts dependent on the similarity of the location of each mobile device associated with the candidate first set of user accounts, and that of the service location.

6. The system of claim 1, wherein the central server is configured to at least one of:

receive features derived from the image from the image capture device, and, in response, determine matches with a candidate second set of user accounts based on the similarity of the known location of the service location from which that image originates, and the location of the mobile device of the candidate second set of user accounts;

determine a match with one of the candidate second set of user accounts dependent on the similarity of features of the captured image, and those of the user-identifying features of the candidate second set of user accounts; and transmit location requests to each mobile device associated with at least one of the candidate first and second set of user accounts to obtain up-to-date location data for those user accounts prior to determining a match with one of them.

7. The system of claim 1, wherein the predetermined probability value is defined in response to at least one of: time of day, day of the week and traffic conditions between the known location of the service location, and that of the mobile device location.

8. The system of claim 1, wherein matching based on the similarity of the known location of the service location, and a mobile device location comprises filtering out user accounts that have a mobile device location update older than a threshold amount.

9. The system of claim 1, wherein the set of user-identifying features in each user account comprises an alphanumeric string, and the system further comprising a feature extraction processor configured to receive images from the image capture device and process them to extract a set of features comprising a corresponding extracted alphanumeric string for use in matching with user account alphanumeric strings, thereby to determine a match with at least one of the user accounts, wherein:

matching of the extracted alphanumeric string with user account alphanumeric strings comprises executing a fuzzy string searching algorithm, a match with at least one of the user accounts being determined if the string distance, as determined by the fuzzy string searching algorithm, is less than a threshold value, executing the fuzzy string searching algorithm comprises applying a character visual-similarity table, wherein string differences less than a threshold value result in a smaller string distance, and the set of user-identifying features in each user account comprises an alphanumeric string of a vehicle registration mark (VRM) of a vehicle serving as a user-identifying asset, wherein executing the fuzzy string searching algorithm comprises applying VRM convention rules, wherein string differences greater than a threshold value result in a larger string distance.

10. The system of claim 1, wherein:

the central server is configured to determine a match with one of the user accounts, and transmit a match message to the mobile device associated with that user account;

the mobile device is configured by the application to receive the match message, and in response issue a notification to a user of the mobile device to indicate readiness to authorize use of the transactional data to perform a transaction, thereby permitting service provision at the service location;

the mobile device is configured by the application to receive the match message and in response display, on an electronic screen of the mobile device, a user-interactable approval element for receiving a user interaction to specify approval of the transaction the mobile device being further configured to send an approval response to the central server dependent on user interaction with the user-interactable approval element;

the central server being configured to authorize use of the transactional data of the user account to perform a transaction dependent on the approval response received from that mobile device; and the match message comprises an identification of the service location, and the mobile device is configured by the application to receive the match message, and in response issue a notification to a user of the mobile device to identify the service location.

11. The system of claim 1, wherein the mobile devices are each configured by the transaction authorization application to:

issue instructions, via a screen of the mobile device, to a user to perform actions involving the user-identifying assets;

record those actions to generate a corresponding set of user-identifying features; and send the set of user-identifying features to the central server to one of establish and update a corresponding user account associated with that mobile device, wherein recording actions performed by the user comprises enabling a camera sensor of the mobile device to record a picture of at least one user-identifying asset, the at least one user-identifying asset comprising at least one of a vehicle registration mark, a vehicle, and a face of a user.

12. The system of claim 1, further comprising a data fidelity checker configured to:

receive a set of user-identifying features intended to one of establish and update a corresponding user account, each user-identifying feature being associated with a predefined category of asset;

check the fidelity of that set of user-identifying features, the fidelity check comprising at least one of:

determining that a user-identifying feature is a valid example of the category with which it is associated;

determining that sufficiently distinguishing features can be extracted from an image of user-identifying asset;

cross-checking one user-identifying feature with another; and cross-checking information derivable from an image of a user-identifying asset against a pre-validated data set;

issue a warning if the fidelity of that set of user-identifying features are insufficient; and authorize one of establishment and update of a corresponding user account depending on the outcome of the fidelity check.

13. The system of claim 1, further comprising a service location controller configured to receive a user account match verification from the central server and in response provide access to a service at the service location, wherein:

the match verification from the central server comprises a fuel dispensing value, and the service location controller is in communication with a fuel dispenser at the service location to control the fuel dispensed by the fuel dispenser in dependence on the fuel dispensing value, the system further comprising an authorization indicator at the service location, wherein the service location controller is configured to receive a match verification from the central server and in response communicate with the authorization indicator to indicate to a user at the service location the status of the authorization.

14. The system of claim 1, further comprising an image-based position detector configured to:

receive a definition of a set of service zones, the definition being associated with the image capture device at a service location, each service zone having associated with it a unique service dispenser;

receive an image from the image capture device;

determine from the received image the occupation by a user-identifying asset of one of the set of service zones;

authorize the service dispenser within the determined one of the set of service zones to dispense a service as part of the transaction authorized by the central server.

15. The system of claim 1, further comprising a barcode uniquely associated with the service location, wherein each mobile device is configured by the application to receive from a user a scan command and in response:

activate a camera of the mobile device to scan the barcode;

derive from the barcode a code uniquely associated with the service location; and send the code to the central server as evidence of the mobile device being at the service location;

the central server being configured to receive the code from the mobile device and in response authorize use of the transactional data of the user account associated with that mobile device to permit service provision at the service location.

16. The system of claim 1, wherein:

each user account comprises a set of user-identifying features, including barcode information that is derivable from an image of a user-identifying asset in the form of a barcode;

each mobile device is configured by the application to:

receive a barcode generation command and in response generate a barcode corresponding to the barcode information within the user account associated with the mobile device; and display the barcode on an electronic screen of the mobile device;

the image capture device is configured to capture and send an image of the barcode displayed on the electronic screen of the mobile device; and the central server is configured to receive at least one of: the image of the barcode from the image capture device, and features derived from the image of the barcode from the image capture device, and in response determine a match with one of the user accounts, wherein each mobile device is configured by the application to receive a barcode generation command and in response:

determine, from a global positioning system of the mobile device, the location of the mobile device; and generate the barcode, at least part of which is dependent on the determined location of the mobile device, and at least part of which is dependent on the time of generation.

17. A computer-implemented transaction authorization method comprising:

(i) maintaining, by a central server, a set of user accounts, each associated with a corresponding one of a plurality of mobile devices, each user account comprising:

a set of user-identifying features, including at least one of: an image of a user-identifying asset, and information that is derivable from an image of a user-identifying asset;

location data, including the location of the associated mobile device, and a location update time for indicating when that location of the associated mobile device was updated; and transactional data for performing a transaction;

the method executing a set of sequential operations for transaction authorization, comprising:

(ii) activating, at an appropriate time for sending a location update, a positioning module of one of the plurality of mobile devices to determine the current location of the mobile device;

(iii) determining a location of the mobile devices, via the positioning module;

(iv) transmitting, by the mobile device, in response to step (ii) and (iii), the determined location to the central server so as to update the location data of a user account of the with which that mobile device is associated;

(v) following transmission, placing the positioning module of the mobile device into a low-power sleep mode so as to conserve energy following transmission;

(vi) automatically capturing and transmitting, by the image capture device located at a service location, an image of a user-identifying asset;

(vii) receiving, by the central server, after completion of step (vi), the image from the image capture device, and features derived from the image from the image capture device, (viii) determining, by the central server, in response to steps (ii)-(vii), a match with one of the user accounts, dependent on:

image similarity, including the similarity of features of the captured image, and those of the set of user-identifying features; and location similarity, including the similarity of the location of the known service location, and the location of the mobile device by:

calculating a time difference between a time of capture of the image of the user-identifying asset, and the time of the mobile device location update;

calculating a distance between the known location of the service location, and that of the mobile device location;

determining the probability of the mobile device travelling the calculated distance within a period corresponding to the calculated time difference; and filtering out user accounts where the determined probability is below a predetermined value; and (ix) authorizing, by the central server, only upon determining a match in step (viii), use of the transactional data of the user account with which a match has been determined to perform a transaction, thereby to permit service provision at the service location within a predetermined timeframe from a capture time of the captured image used by the server to determine a match with that user account.

* * * * *